United States Patent

[11] 3,557,674

| [72] | Inventor | Russell F. Carney, Jr. |
| | | Rochester, N.Y. |
| [21] | Appl. No. | 703,152 |
| [22] | Filed | Feb. 5, 1968 |
| [45] | Patented | Jan. 26, 1971 |
| [73] | Assignee | Seminole Pollution Equipment Corporation |
| | | Rochester, N.Y. |
| | | a corporation of New York |

[54] CAMERA DEVICE FOR INTERNAL INSPECTION OF PIPE
2 Claims, 5 Drawing Figs.

| [52] | U.S. Cl. | 95/11 |
| [51] | Int. Cl. | G03b 37/00 |
| [50] | Field of Search | 95/11C, 15, 11.5; 346/107W; 240/1.3; 352/171 |

[56] References Cited
UNITED STATES PATENTS

| Re. 24,076 | 10/1955 | Laval, Jr. | 95/11HC |
| 2,338,029 | 12/1943 | Doll; H. | 95/11HC |
| 2,933,024 | 4/1960 | Baggs et al. | 95/11HC |
| 3,244,085 | 4/1966 | Pulfer | 95/11HC |
| 3,424,071 | 1/1969 | Schwahn | 95/11.5 |

*Primary Examiner*—John M. Horan
*Attorney*—Hoffman Stone

ABSTRACT: A single frame 35 mm. camera is mounted in a generally cylindrical capsule with a strobe light, an electric drive motor, and a battery. The system is self-contained except for a remote annunciator arrangement and control switch connected to the capsule by a single pair of electrical leads. The strobe light is fired by the discharge of a capacitor, which immediately thereafter starts to charge. The annunciator includes a buzzer shunted by a gas filled diode lamp. The buzzer sounds during charging of the capacitor, and shuts off when the diode fires, which occurs when the capacitor becomes approximately fully charged.

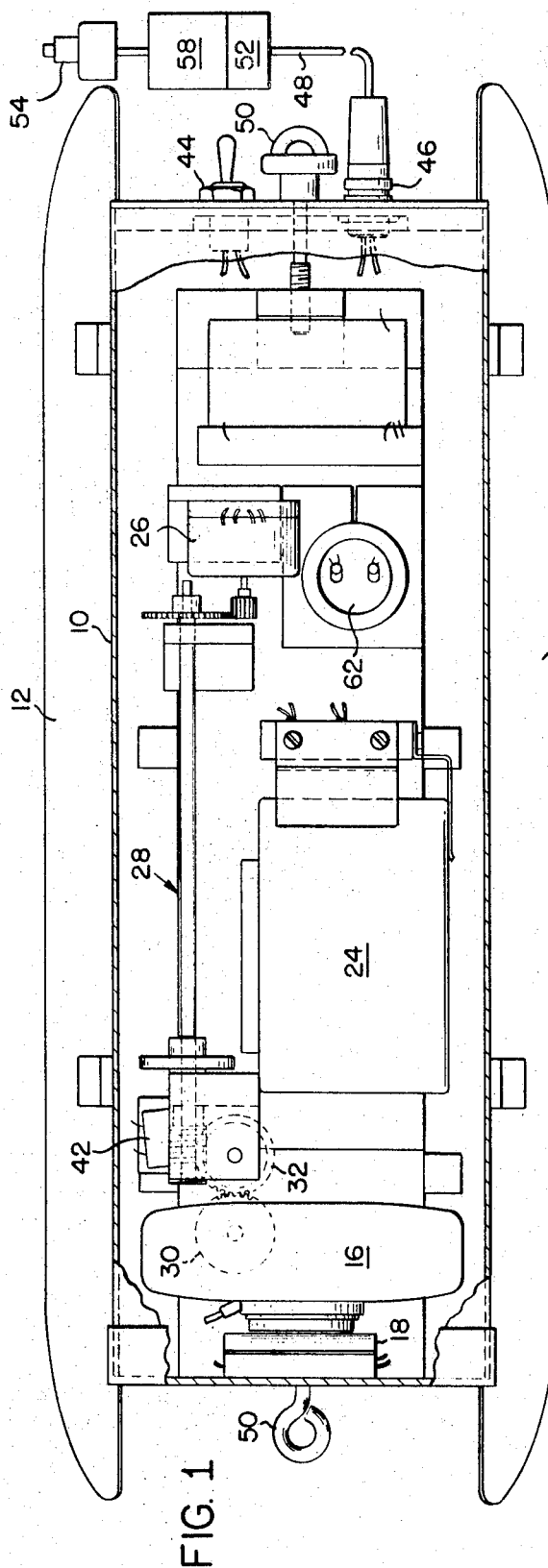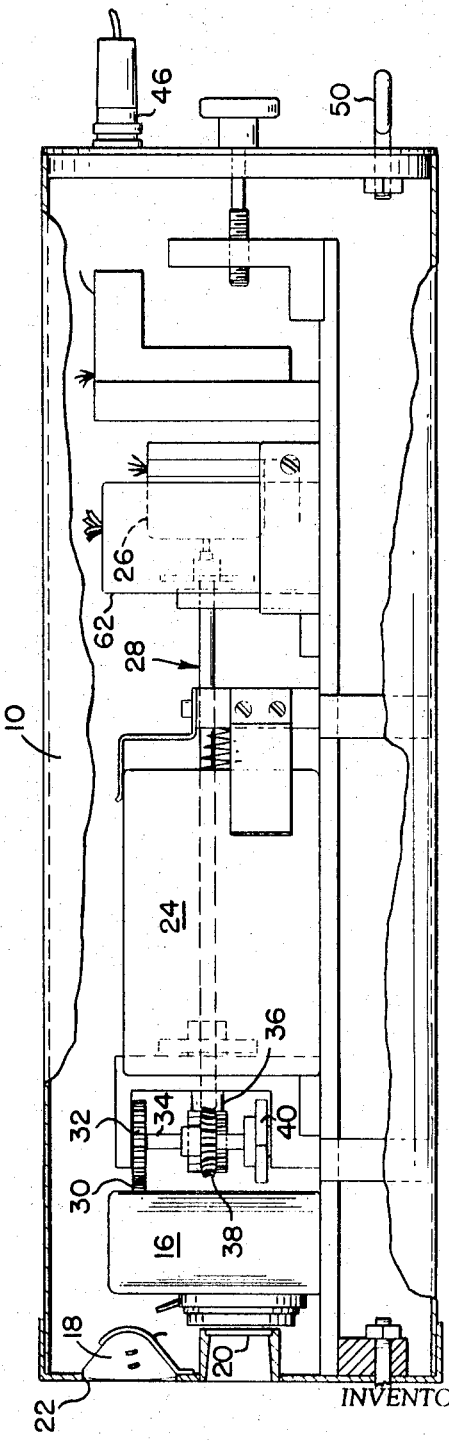
FIG. 1
FIG. 2
INVENTOR
RUSSELL F. CARNEY, JR.
BY Hoffman Stone 3,557,674

RUSSELL F. CARNEY, JR.
BY
ATTORNEY

CAMERA DEVICE FOR INTERNAL INSPECTION OF PIPE

BRIEF SUMMARY

This invention relates to a novel photographic device for inspecting the interiors of pipes such as water mains, sewer lines, oil wells, and the like, and, more particularly, to a device of this kind arranged to provide a signal at a remote location indicating its proper operation.

Several different devices are available for making photographic observations of the interiors of pipes, some of which include either 16 mm. or 8 mm. motion picture cameras arranged either for continuous filming or for intermittent single frame operation, but those so far available have been subject to one or more of several disadvantages. Some of them require a relatively high degree of skill for proper operation. Some have unduly high power requirements such that they must be powered from an external remote source. Some are relatively bulky and limited to use in pipes of relatively large diameters. And, most of them have been very expensive.

Briefly, the device of the invention includes a relatively small capsule that may be fitted in and pulled through pipes at least as small as 8 inches i.d. The capsule mounts a compact 35 mm. single frame camera, a strobe light, a battery, a drive motor, and a geared drive train, including a cam actuated limit switch, for advancing the film in the camera and firing the strobe light. The camera is selected to be one requiring rotation of the drive member of its film advance mechanism through an integral factor of 360° for each frame, thereby enabling cycling control by the use of a simple cam and limit switch arrangement, which may also include a momentary contact switch for triggering the strobe light. The unit is self-powered, and requires only a single pair of relatively small diameter signal carrying wires between it and the remote control location. Connections are made to the charging circuit for the strobe light to indicate proper operation of the unit at the remote location, and to provide a ready signal when the charging unit is fully charged.

DETAILED DESCRIPTION

The presently preferred embodiment of the invention will now be described in connection with the accompanying drawings, wherein:

FIG. 1 is a plan view, with parts broken away, of the pipe-inspecting camera device according to the presently preferred embodiment of the invention;

FIG. 2 is a side elevational view, with parts broken away, of the device shown in FIG. 1;

Figure 3:
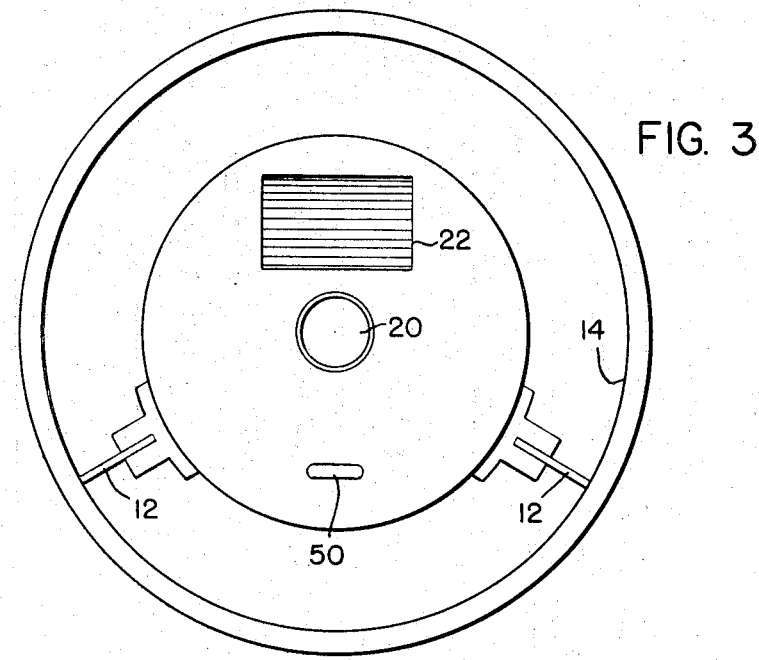
FIG. 3 is a front elevational view of the camera device.
Figure 4:
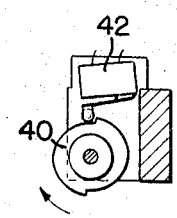
FIG. 4 is a plan view, partly in section, of the cam and limit switch arrangement that controls cycling of the camera drive.

As shown, the device includes a cylindrical housing 10 which is preferably sealed to be water and vapor tight. A pair of runners 12 are fixed exteriorly of the housing for holding it upright and spaced from the interior wall of the pipe 14 when in use. A camera 16, and a strobe light 18 are mounted inside the housing at one end thereof facing outwardly in the longitudinal direction through respective windows 20 and 22. A battery 24, a drive motor 26 with its drive train 28, and capacitors and other electrical circuit components are all mounted within the cylinder as desired behind the camera 16 and the strobe light 18. The housing 10 is normally opened for servicing from the front, and the battery 24 is preferably mounted next behind the camera 16 to facilitate its replacement.

The film advance mechanism in the camera 16 is driven by a wheel 30, which rotates through an integral factor, in this case 180°, of 360° to complete each advance. The ratchet arrangement found in the usual commercial camera is replaced with a simple gear wheel 30, which meshes with another gear 32 fixed to a countershaft 34 in the drive train. The countershaft 34 is driven through a worm 36 and worm wheel 38 from the motor 26, which, as shown, is an inexpensive 6 volt motor having a permanent magnet field for minimum current consumption. A cam 40 is also fixed on the countershaft 34 for operating a limit switch 42, thereby to control the energization and deenergization of the motor 26, and preferably also to fire the strobe light 18. A master switch 44, and a connecting receptacle 46 are sealed through the rear wall of the housing, and a single pair of signal wires 48 are plugged into the receptacle 46 for remote control and monitoring. Eye bolts 50 are secured front and rear to the housing for pulling the device through a pipe to be photographed.

If desired, the strobe light 18 may be triggered by the standard synchronizing contacts of the camera shutter (not shown) in which case the shutter is set to trip automatically at the end of the film advance. The arrangement shown, however, is preferred because the shutter may be dispensed with, saving its cost, and also saving the energy needed to cock it, thereby extending the usable life of the battery 24.

A 22.5 volt battery 52 (FIG. 5) is located at the remote control station for initiating operation of the motor 26. It has a very light duty cycle and may be of small size.

Operation of the motor 26 is initiated by brief actuation of the remote starting switch 54, which, when closed, connects the battery 52 across the two signal wires 48 to energize a starting relay 56 in the housing. When the relay 56 picks up, its contacts close to complete the energizing circuit for the motor 26, which drives the film advance mechanism and the cam 40. The limit switch 42 closes very soon after the motor 26 starts. It is connected in parallel with the contacts of the starting relay 56 and maintains the motor energized until the cam 40 rotates to its next fall. If desired, to insure that the limit switch 42 closes before the relay 56 drops out, an electrical interlock (not shown) may be provided, or the relay 56 may be of the delayed release type so that once energized, it is certain to stay picked up long enough to allow for the required cam travel.

If desired, a second set of contacts (not shown) on the relay 56 may be used to trigger the strobe light 18, in which case the picture is taken before the film is advanced. In this mode, the strobe firing circuit charges during the film advance, and the battery must furnish current to the charging circuit and to the drive motor 26 simultaneously. To maximize battery life, therefore, it is presently preferred to fire the strobe light only after the film is advanced, thereby reducing the maximum load on the battery 24.

The monitoring circuit of the invention is arranged to bleed enough current from the firing circuit that actuates the strobe light to operate a buzzer 58, or other indicator at the remote location during the charging period of the firing circuit, and to draw only negligible current from the firing circuit when the circuit is charged to its operating voltage.

Figure 5:
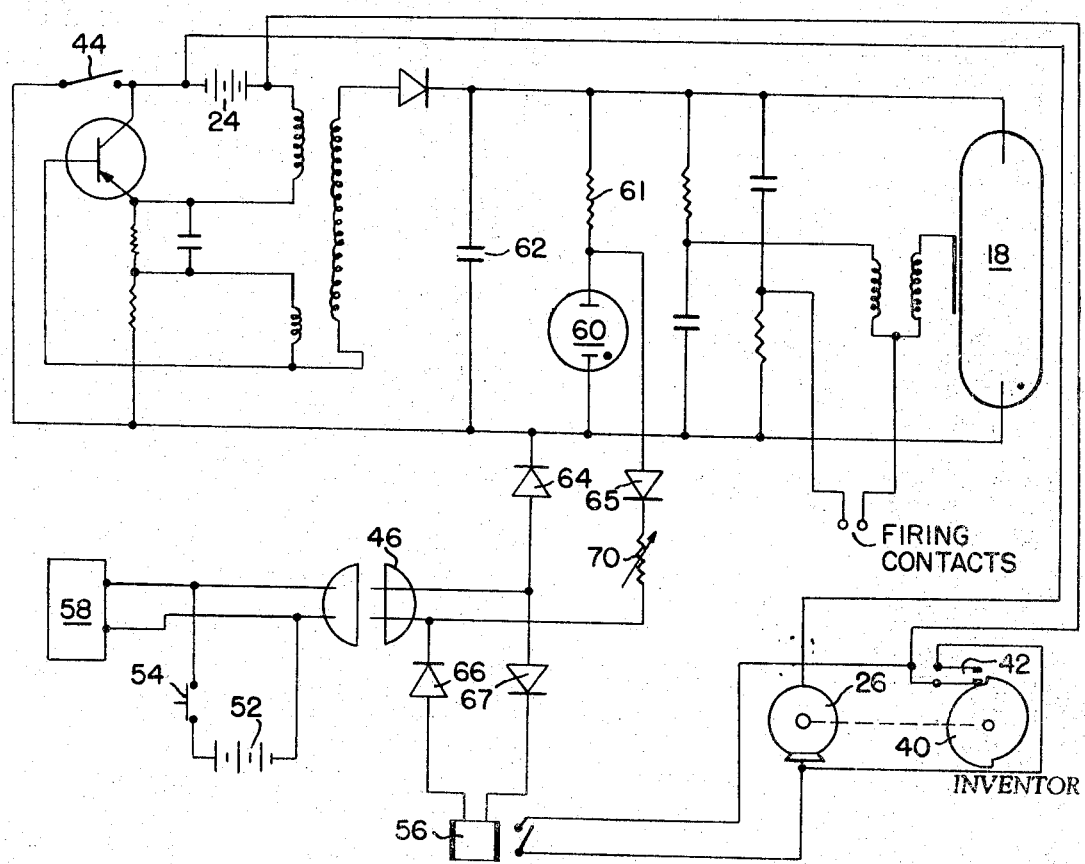
FIG. 5 is a schematic electrical circuit diagram showing the electrical arrangement of the device for advancing the film, firing the strobe light, and providing the remote signal indicating proper operation.

The firing circuit shown in the upper half of FIG. 5, but not generally designated, is of conventional type and need not be described herein in detail. It includes a ready indicator light 60 of the gas filled diode type connected across the main storage capacitor 62 in series with a resistor 61, typically of one megohm value. The light 60 remains nonconductive and OFF until the voltage across it reaches the determined operating voltage at which the capacitor 62 is fully charged and ready to fire the strobe light 18. When the capacitor 62 is charged to the prescribed voltage, the light 60 fires, and the voltage across it drops to a very low value, typically only a few volts. The signal wires 48 are connected across the signal light 60 through a pair of diodes 64 and 65, respectively, and another pair of diodes 66 and 67, respectively, is connected between the signal wires 48 and the starting relay 56. The diodes 64-—68 are poled to isolate the relay 56 from the firing circuit, while still allowing current to flow to the relay 56 from the starting battery 52. A variable limiting resistor 70 is in series with one of the diodes 64 and 65 to insure that sufficient voltage develops across the signal light 60 to fire it, and to limit the current drawn by the signal light 60 from the starting battery 52 during the momentary actuation of the starting switch 54.

Very quickly after each firing of the strobe light 18, the voltage across the signal light 60 becomes high enough to energize the buzzer, which then continues energized until the signal light 60 fires. The buzzer 58 is selected to be one having a relatively high impedance input and low current requirement, typically one designed for normal operation at 6 volts. It is not over loaded, however, because the current is limited by the 1 megohm resistor 61. The variable resistor 70 is also adjusted to insure against response of the buzzer 58 to the low voltage across the signal light 60, while the signal light is conducting.

To take each picture, the operator simply closes the start switch 54 briefly and waits a few seconds for the buzzer 58 to sound, indicating that the picture has been taken. He may then immediately pull the device into position for the next picture, and take it after checking to be certain the buzzer has stopped.

With the single frame camera, some 72 pictures may be obtained on a standard commercial 35 mm. film cartridge. With the strobe light in the close confines of a pipe, a relatively small lens aperture may be used, giving good depth of field. Pictures are taken, typically, at intervals of 5 or 10 feet to give a complete, detailed view of the interior of the pipe without omitting any portion of its length. At 5 foot intervals, 72 pictures show some 360 feet of pipe, a length fully adequate for a wide range of commercial needs.

I claim:

1. A photographic device for taking pictures of the inside walls of pipes comprising:
   a. a generally cylindrical housing having closed ends;
   b. a camera and a strobe light adjacent to one end wall of said housing and aimed axially outwardly;
   c. windows in said one end wall for said camera and said light;
   d. a motor for advancing film in said camera;
   e. means for removably mounting a battery in said housing, and connecting it to energize said strobe light and said motor;
   f. said camera being of the type in which full film advance is accomplished by rotation of an actuating member through an integral factor of 360°;
   g. a cam geared to the actuating member of said camera;
   h. a limit switch operated by said cam and connected in the energizing circuit of said motor for alternately completing and breaking the energizing circuit;
   i. a firing circuit for said strobe light energized by said battery, including a capacitor, means for charging said capacitor to a predetermined voltage, and a ready light connected in series with a resistor across said capacitor;
   j. said ready light being of the type that remains nonconductive until a voltage of predetermined magnitude is applied across it, and once conductive, continues to conduct with a very small applied voltage;
   k. electrical leads connected across said ready light and extending to a remote control location; and
   l. an indicator device connected between said leads at the remote location, and arranged to produce a sensible signal whenever the voltage applied to said ready light substantially exceeds the very small value at which said ready light continues to conduct.

2. A photographic device according to claim 1, wherein said leads constitute the only electrical connection between the device and the remote control location, and including:
   a. a relay in said housing connected between said leads and having normally open contacts in parallel with said limit switch;
   b. an auxiliary battery;
   c. a switch at the remote location for connecting said auxiliary battery between said leads; and
   d. unidirectional current devices for isolating said relay from the voltage applied to said ready light and facilitating current flow from said auxiliary battery to said relay.